Aug. 26, 1958

M. S. JAFFE 2,849,339

INDIUM BASIC TRIFLUORACETATE AND METHOD OF
COATING VITREOUS BODIES THEREWITH

Filed April 8, 1953

2-CONDUCTIVE COATING.
1-GLASS PAPER SHEET.

4-CONDUCTIVE COATING.
3-GLASS PLATE.

Inventor:
Mary S. Jaffe,
by *Ernst W. Lupus*
His Attorney.

United States Patent Office 2,849,339
Patented Aug. 26, 1958

2,849,339

INDIUM BASIC TRIFLUORACETATE AND METHOD OF COATING VITREOUS BODIES THEREWITH

Mary S. Jaffe, Cleveland Heights, Ohio, assignor to General Electric Company, a corporation of New York Application April 8, 1953, Serial No. 347,617

8 Claims. (Cl. 117—211)

This invention relates in general to electroconductive coatings on glass and similar high temperature resistant substrates, and more particularly to a new indium-containing coating and to a compound and method useful in forming it.

It is well known that when glass or other vitreous bodies are heated and contacted with certain metal salts, either in the form of vapors or atomized solutions thereof, an adherent layer of an oxide of the metal is formed on its surface. The process is generally known as iridizing, because the coatings produced thereby are extremely thin and frequently iridescent due to interference of the light reflected from the surfaces of the film and of the substrate.

The materials which have been most generally used up to the present time for electroconductive iridized coatings, as on commercial conducting glass for instance, have been stannic oxide and indium oxide. Suitable activators which increase the conductivity of these basic oxides may be added; for instance, antimony and zinc may be added as activators to stannic oxide, and tin may be added as an activator to indium oxide. The coatings are generally formed by spraying the hot glass with an aqueous or organic solution of a suitable salt of the metal, for instance stannic tetrachloride in the case of a tin oxide coating, with or without added activators and stabilizers. Another method which has been used consists in exposing the hot glass directly to the vapors of the metal salt, for instance stannic tetrachloride, in a moist atmosphere.

While the above-described methods are quite suitable for the production of large plane sheets of conducting glass, such as used for instance in de-iceable windshields, heater elements and the like, or for coating the exteriors of glass tubes, it has serious disadvantages for other applications. For instance, it is a very poor method for coating the interiors of narrow tubes or bent tubes, because of the difficulty of introducing a spray gun and producing a uniform film. It is also not too suitable for rendering conductive a fibrous glass paper or cloth. It will readily be appreciated that where a spray is directed on a fibrous material, the coating tends to pile up on the outer fibers or strands of the material and will not penetrate readily into the spaces between the fibers. As a result, adequate fiber to fiber electrical contact is not achieved and an unusably high electrical resistance results.

An object of the invention is to provide a new and improved kind of transparent electroconductive coating on glass or other high temperature resistant substrate.

Another object of the invention is to provide a new compound useful in the production of indium containing films and particularly of such films in situations where the spray or vapor contact methods are not feasible.

A further object of the invention is to provide a new and improved process for producing indium-containing films and which is particularly advantageous in making films of high electrical conductivity on fibrous glassy material.

In accordance with the invention, I have discovered a new electroconductive coating comprising a compound of indium. I have also discovered a highly effective liquid dipping method for producing a conductive film and a new compound used in carrying out the method.

Figure 1:
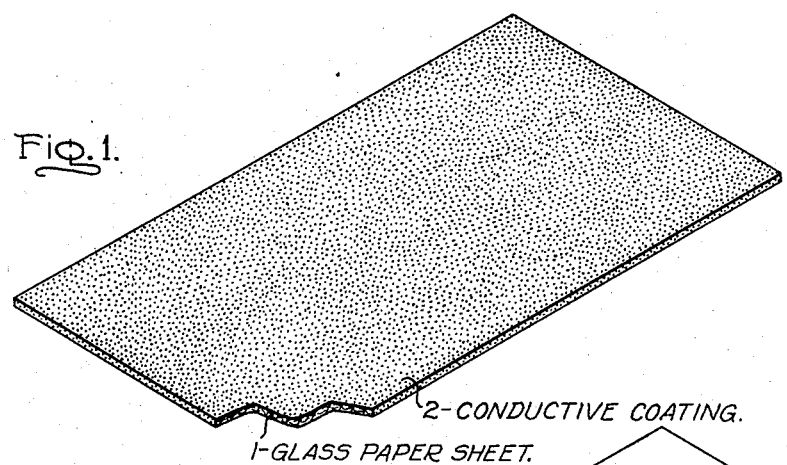
Fig. 1 illustrates pictorially a fibrous glass sheet or glass paper made conductive in accordance with the invention.

It will readily be appreciated that a liquid dipping method is ideally suited to coating the interiors of tubes and also to coating fibrous glass papers and fabrics because the capillarity and wetting ability of the liquid will carry it into all the crevices of the material. The liquid must have suitable surface tension and also interfacial tension to the surface of the glass or other substrate in order to promote the initial wetting. Furthermore, the liquid must have sufficient viscosity to remain in a continuous sheet as it dries. It must not break up into droplets or crystals, but must dry in a manner analogous to the familiar high polymers of which ordinary lacquers and varnishes are made. Salt solutions in general do not have this property and, to the best of my knowledge, none of the compounds mentioned in the prior art for the formation of conductive iridized coatings have this property.

In accordance with the invention, and quite unexpectedly, I have found that the compound formed by dissolving indium hydroxide $(In(OH)_3)$ in trifluoroacetic acid $(CF_3COOH)$ dries from an aqueous or organic solution without apparent crystallization. In the drying, there is produced progressively a thick honey-like liquid, a glassy mass, and finally upon vacuum dehydration at around 100° C., a light tan or white crumbly solid. The formula weight of the dried product is $In(OH)(CF_3COO)_2$ which would indicate that it is analogous to the basic acetate of aluminum. Its structural formula appears to be

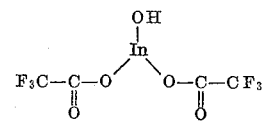

The above-described polymer-like behavior of indium basic trifluoroacetate (hereafter abbreviated InBTFA) was entirely unexpected. I interpret it to mean that the InBTFA molecules tend to be polymerized in solution and thus have a molecular weight greater than the formula weight. This would explain the drying to a viscous mass without crystallization, which occurrence, it will be appreciated, is factual independently of the validity of my interpretation.

InBTFA may be prepared from indium hydroxide in the following manner. The indium hydroxide itself may if desired be obtained through known processes, generally involving the precipitation of the hydroxide from an indium salt by means of an alkali. Precipitates of group III hydroxides, however, are generally gelatinous and difficult to handle and may occlude large amounts of impurities. I prefer to use a granular or crystalline precipitate of indium hydroxide which I form by precipitation from homogeneous solution of indium trichloride. The process involves boiling the aqueous indium trichloride solution with urea, preferably in the presence of formic acid or ammonium formate. With continuous stirring, a clumped crystalline aggregate of indium hydroxide forms which is easily removed by filtering and which may then be washed.

The indium hydroxide crystals are dissolved with refluxing in an excess of aqueous trifluoroacetic acid, and the excess water and acid is then boiled or pumped off. The product is indium basic trifluoroacetate and it dries in the manner described earlier, that is, forming progressively a thick viscous liquid, then a glassy mass, and finally a light tan or white crumbly solid. This dried product may then be dissolved in a suitable solvent serving as a vehicle to form a "varnish" of InBTFA. A suitable solvent is the "Cellosolve" acetate of Carbide and Carbon Chemicals Corporation, consisting of ethylene glycol monoethyl ether acetate. Another suitable solvent is 1,4 dioxane=(diethylene dioxide). A preferred mixed-type solvent consists of equal parts by weight of triethylene glycol dimethyl ether and the above-mentioned "Cellosolve" acetate.

Figure 2:
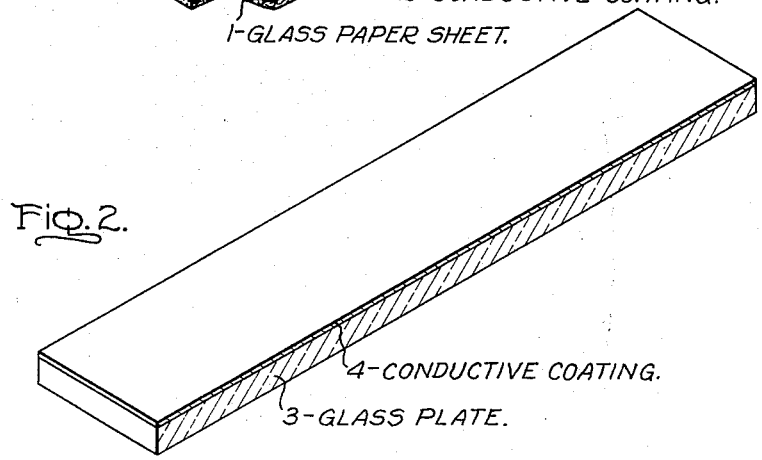
Fig. 2 illustrates a glass plate provided with a conductive coating in accordance with the invention.

The varnish of InBTFA spreads smoothly on glass or other nonporous substrate and dries to a thin, hard non-tacky film. The film at this stage is still soluble in water and many organic solvents, but loses its solubility upon heating to temperatures in excess of 250° C. Upon heating, for instance to 600° C., the film decomposes, with some loss of material, to a stable water-insoluble, transparent and electrically conducting compound of indium. Referring to Fig. 2, there is shown a glass plate 3 provided with an electrically conducting film 4 consisting of a compound of indium in accordance with the invention. It will be appreciated that it is extremely difficult to determine the exact chemical composition of films of the present type; they are extremely thin and cannot be scraped off the glass; furthermore, they are insoluble and weigh less than 1 milligram per area of 25 centimeter square. However, the physical characteristics of the film, and X-ray diffraction study definitely show that it is not the indium sesquioxide ($In_2O_3$) known to the prior art. The film, when formed on flat glass, is hard, smooth, iridescent when of appropriate thickness, and quite free of the haze frequently found with sprayed films. It has a refractive index greater than 1.5 and less than 1.8, being generally between 1.6 and 1.7, and close to 1.67; this is appreciably lower than the refractive index of stannic oxide (about 2.0) and much lower than that of indium sesquioxide (about 2.2). It will be appreciated that the low refractive index of the film in accordance with my invention results in a product of far lower light-reflecting power, and hence of higher light-transmitting power. This feature is particularly desirable in a de-iceable windshield for aircraft where the light-transmitting power and the avoidance of reflection of stray light from the interior of the aircraft are matters of prime importance.

Iridized indium oxide films of high purity are rather poor conductors and have specific resistivities of 1 ohm-cm. or higher. The specific volume resistivity, it will be appreciated, is the resistance that would be measured across opposite faces of a cube of the substance of unit length along a side. The addition of small amounts of certain conductivity activators to the indium oxide may increase its conductivity enormously. For instance, the addition to an indium oxide film of stannic oxide in amounts between 0.1 and 45%, as taught in U. S. Patent 2,564,709, Mochel, may lower the specific resistivity to about 0.002 ohm-cm. in the case of sprayed films. The compound of indium of my invention also benefits in conductivity from the addition of tin. In general, I prefer to add tin in proportions falling within the range of 4% to 16% of tin relative to total moles of indium plus tin in the solution with which the substrate is coated, the preferred porportion being approximately 8%. For wet-coated and fired films made in accordance with my invention from a varnish consisting of InBTFA in a "Cellosolve" acetate, and containing stannic tetrachloride as an activating agent, I have achieved specific resistivities of the order of 0.030 ohm-cm. While it is appreciated that this specific resistivity is not yet as low as what may be achieved with sprayed films of stannic oxide, it is nevertheless usably low for certain electric resistance applications. Furthermore, as has already been explained, my films may be formed in circumstances where it is unfeasible to use the prior art spraying or vapor phase processes, and have additionally the feature of a lower refractive index resulting in lower reflectivity.

It is sometimes convenient to express the electrical resistance of an iridized film in terms of ohms per square for a stated thickness. This is made possible by the fact that the resistance of the film measured between two parallel conducting lines varies inversely with the length of the lines and directly with the distance between them, so that when the lines define a square, the resistance is constant, irrespectively of the size of the square. It will be understood, of course, that the resistance varies inversely with the thickness of the film. A convenient thickness to use as a standard is one corresponding to an optical retardation of about 0.475 micron which will exhibit a characteristic brownish-red interference color, the so-called "sensitive tint" or "first order red" interference color. A film exhibiting this characteristic color will have a physical thickness of 0.475 micron divided by twice the refractive index of the film. The film described earlier and having a specific resistivity of 0.030 ohm-cm. when made to this thickness will exhibit a resistance of 2100 ohms per square.

It is a well known fact that thin films often exhibit a refractive index lower than that of the same material in bulk form, probably due to the porosity of the film. The measurement of the refractive indices of such thin films is a matter of considerable technical difficulty. Approximate measurements by transmission spectrophotometry indicate that tin-activated indium oxide films made by the spray method have an index of about 1.98, while unactivated indium compound films made according to my invention have an index of 1.66 to 1.67. The added tin activator modifies the index of the film in an as yet unexplained manner: large amounts of tin (in excess of the earlier stated 4% to 16% preferred range) raise the index, while small amounts near the conductivity-optimum concentration (8%) have been observed to lower the index at times to a value slightly less than that of the glass substrate (1.52). This unexplained effect may be used to advantage to control the refractive index of the film, rather than its electrical conductivity as heretofore explained. For instance, by making the refractive index of the film equal to that of the glass, the reflection loss may be cut down to substantially zero. As previously pointed out, this may be highly desirable for certain applications.

One of the most promising fields of application of my new method of producing iridized conductive films by dipping in liquid InBTFA varnish, is the making of conductive flexible sheets of fibrous glass. Glass fibers may be disposed at random and compacted into paper-like sheets, or the fibers may first be formed into yarn, which yarn may then be woven in the usual fashion into cloth. Referring to Fig. 1, a sheet of glass paper 1 is illustrated, its conductive character being indicated by the stippling 2. Such fibrous glass sheets rendered conductive in accordance with my invention promise to become of general utility in many applications. For instance, they may be used as translucent electrical shields to avoid static electricity hazards in the operating rooms of hospitals and other areas where explosive vapors are found. Another application holding forth considerable promise is in the making of electroluminescent panels, the flexible conductive glass sheet to serve as the transparent conductor of the electroluminescent cell or capacitor. Reference may be made to my copending application No. 347,575, filed April 8, 1953, now Patent 2,774,004, entitled "Flexible Electroluminescent Laminated Panel," and assigned to the same assignee as the present application, for a more complete description of this device.

To illustrate the applicability of my method to the making of conductive flexible glass sheets, I have made conductive coatings on pieces of glass cloth by dipping in InBTFA varnish containing 10 mol percent tin. In order to be able to measure the resistance of the coating, the pieces of cloth were first provided with fired-on silver paste electrodes which were applied through a stencil as two 1 x ⅛ inch bars spaced opposite and parallel to each other, and one inch apart, thus defining a square. After dipping in the varnish, the pieces of cloth were placed in a muffle set at 600° C. for five minutes; this process, that is the dipping in the varnish and baking, was repeated twice more. The resistance measured between the electrodes after each dipping and baking was as follows:

| Number of coats | Resistance |
| --- | --- |
| 1 | 350,000 ohms per square. |
| 2 | 11,000 ohms per square. |
| 3 | 2,600 ohms per square. |

It will be appreciated, upon consideration of the above results, that the resistance may be controlled within wide limits and may be lowered by repeating the dipping and baking process so as to build up the thickness of the iridized coating. The resistance may be made higher by using a thinner varnish, that is by adding a lesser quantity of indium basic trifluoroacetate to a given volume of the vehicle.

It is to be understood that the specific forms of the invention which have been described are to be taken as illustrative and not as limitative of the invention. Obviously, various changes may be resorted to without departing from the spirit of the invention whose scope is to be defined by the subjoined claims.

What I claim as new and desire to secure by Letters Patent of the United States is:

1. Indium basic trifluoracetate having the following formula:

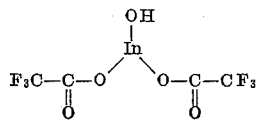

2. A varnish consisting of indium basic trifluoracetate having the formula $In(OH)(CF_3COO)_2$ in a nonreactive vehicle.

3. A varnish consisting of indium basic trifluoracetate having the formula $In(OH)(CF_3COO)_2$ in an organic solvent and containing a tin salt.

4. The method of forming a conductive iridized coating on a high temperature resistant vitreous body which comprises flowing a varnish of indium basic trifluoracetate onto said body and then heating the said body to decompose the varnish to a conductive coating.

5. The method of forming a conductive iridized coating on a vitreous body which comprises flowing a varnish of indium basic trifluoracetate having added thereto a tin salt in a ratio between 4 to 16 percent moles of tin relative to total moles of indium plus tin, onto said body and then heating the said body to decompose the varnish to a conductive coating.

6. The method of forming a conductive iridized coating on a fibrous glass material which comprises dipping the material into a varnish of indium basic trifluoracetate and then baking the material at a temperature sufficient to decompose the varnish to a conductive coating.

7. The method of forming a conductive iridized coating on a vitreous body which comprises flowing a varnish of indium basic trifluoracetate onto said body and then heating said body to a temperature in excess of 250° C. and sufficient to decompose the varnish to a conductive coating.

8. The method of forming a conductive iridized coating on a vitreous body which comprises flowing a varnish of indium basic trifluoracetate onto said body and then heating said body to a temperature in the neighborhood of 600° C. in order to decompose the varnish to a conductive coating.

References Cited in the file of this patent

UNITED STATES PATENTS

| | | |
| --- | --- | --- |
| 2,194,189 | Wheeler et al. | Mar. 19, 1940 |
| 2,397,929 | Dimmick | Apr. 9, 1946 |
| 2,567,011 | Diesslin et al. | Sept. 4, 1951 |
| 2,569,773 | Orr | Oct. 2, 1951 |
| 2,606,566 | Tarnopol | Aug. 12, 1952 |
| 2,617,741 | Lytle | Nov. 11, 1952 |
| 2,617,742 | Olson | Nov. 11, 1952 |
| 2,740,731 | Lytle et al. | Apr. 3, 1956 |